United States Patent
Konishi

(10) Patent No.: US 10,935,412 B2
(45) Date of Patent: Mar. 2, 2021

(54) METHOD FOR DETECTING SOLID-LIQUID DISTRIBUTION IN SOLID-LIQUID SEPARATION COLUMN OF SOLID-LIQUID SEPARATION DEVICE AND DETECTION DEVICE

(71) Applicant: Meiji Co., Ltd., Tokyo (JP)

(72) Inventor: Nobuyuki Konishi, Odawara (JP)

(73) Assignee: Meiji Co., Ltd., Tokyo (JP)

( * ) Notice: Subject to any disclaimer, the term of this patent is extended or adjusted under 35 U.S.C. 154(b) by 203 days.

(21) Appl. No.: 16/300,433

(22) PCT Filed: May 11, 2017

(86) PCT No.: PCT/JP2017/017769
§ 371 (c)(1),
(2) Date: Nov. 9, 2018

(87) PCT Pub. No.: WO2017/195846
PCT Pub. Date: Nov. 16, 2017

(65) Prior Publication Data
US 2020/0309588 A1    Oct. 1, 2020

(30) Foreign Application Priority Data
May 12, 2016  (JP) .............................. JP2016-096075

(51) Int. Cl.
G06K 9/00       (2006.01)
G01F 23/292     (2006.01)
(Continued)

(52) U.S. Cl.
CPC .......... *G01F 23/292* (2013.01); *G06T 7/0002* (2013.01); *G06T 7/11* (2017.01);
(Continued)

(58) Field of Classification Search
CPC .............. B03D 1/1431; B01D 17/0205; B01D 19/0063; H04N 13/0239; H04N 13/0082;
(Continued)

(56) References Cited

U.S. PATENT DOCUMENTS 5,463,228 A      10/1995 Krause
5,509,460 A *    4/1996 Chun ................... B22D 11/207
                                                  164/45
(Continued)

FOREIGN PATENT DOCUMENTS

EP       1051913 A2    11/2000
FR       2582804 A1    12/1986
(Continued)

OTHER PUBLICATIONS

International Search Report for corresponding International Application No. PCT/JP2017/017769 dated Aug. 8, 2017.

*Primary Examiner* — Amir Alavi
(74) *Attorney, Agent, or Firm* — Renner, Otto, Boisselle & Sklar, LLP

(57) ABSTRACT

A method and a device, for detecting a solid-liquid distribution in a solid-liquid separation column of a freeze concentration device, that are used when a freeze concentration method is performed is suggested. The device for detecting the solid-liquid distribution in the solid-liquid separation column of a solid-liquid separation device includes a light irradiation means for irradiating the inside of the solid-liquid separation column of the freeze concentration device with visible light, a photographing means for picking up an image of the inside of the solid-liquid separation column irradiated with the visible light by the light irradiation means, a movement means for moving the photographing means in an up-and-down direction of the solid-liquid separation column, an image analysis means for analyzing a data piece of an image picked up by the (Continued)

photographing means and a determination means for determining a solid-liquid distribution state in the solid-liquid separation column based on a result of an analysis made by the image analysis means.

4 Claims, 2 Drawing Sheets

(51) Int. Cl.
  *G06T 7/11*   (2017.01)
  *G06T 7/00*   (2017.01)

(52) U.S. Cl.
  CPC ............... *G06T 2207/10152* (2013.01); *G06T 2207/30181* (2013.01)

(58) Field of Classification Search
  CPC ... G06T 7/0075; G06T 7/0022; G06T 7/0081; G06T 7/0083; G06T 2207/10012; G06T 2207/20144; G06T 2207/10016; G06T 7/0002; G06K 9/00196; G06K 9/38; G01F 23/292
  See application file for complete search history.

(56) References Cited

U.S. PATENT DOCUMENTS

| | | | | |
|---|---|---|---|---|
| 6,952,487 | B2* | 10/2005 | Patton | .................. G01C 11/02 |
| | | | | 252/301.19 |
| 9,899,547 | B2* | 2/2018 | Engel | .................. H01L 31/0384 |
| 10,040,074 | B2* | 8/2018 | Damann | .............. B03D 1/1431 |
| 10,634,284 | B2* | 4/2020 | Chakkalakal | ............. F17D 3/01 |
| 2004/0241873 | A1* | 12/2004 | Davis | ................. G01N 21/6456 |
| | | | | 436/172 |
| 2005/0200851 | A1 | 9/2005 | Kojima | |
| 2016/0205959 | A1 | 7/2016 | Kashiwagi et al. | |
| 2018/0116235 | A1 | 5/2018 | Kashiwagi et al. | |
| 2019/0388928 | A1* | 12/2019 | Ko | .................... H01L 21/67276 |

FOREIGN PATENT DOCUMENTS

| | | |
|---|---|---|
| JP | 57-006341 A | 1/1982 |
| JP | 6-129982 A | 5/1994 |
| JP | 9-079977 A | 3/1997 |
| JP | 2000-316481 A | 11/2000 |
| JP | 2002-247953 A | 9/2002 |
| JP | 2005-257379 A | 9/2005 |
| JP | 2013-162758 A | 8/2013 |
| WO | WO 2009/060169 A1 | 5/2009 |
| WO | WO 2015/030161 A1 | 3/2015 |
| WO | WO 2015/030162 A1 | 3/2015 |
| WO | WO 2015/137423 | 9/2015 |

* cited by examiner

| HEIGHT IN COLUMN (mm) | TOTAL TEAR AMOUNT | | | | |
|---|---|---|---|---|---|
| | MEASUREMENT 1 | MEASUREMENT 2 | MEASUREMENT 3 | MEASUREMENT 4 | MEASUREMENT 5 |
| 200 | 2266 | 2337 | 2450 | 2496 | 2307 |
| 250 | 1657 | 2874 | 1639 | 1562 | 2144 |
| 300 | 2147 | 2507 | 2258 | 2367 | 2426 |
| 350 | 2276 | 2095 | 2402 | 1869 | 1722 |
| 400 | 2548 | 1846 | 2193 | 3075 | 1817 |
| 450 | 2258 | 1811 | 1168 | 2288 | 2236 |
| 500 | 2052 | 2039 | 2028 | 2269 | 2061 |
| 550 | 6897 | 7324 | 9385 | 8494 | 8694 |
| 600 | 9733 | 9315 | 9818 | 9571 | 8831 |
| 650 | 7058 | 7433 | 7601 | 6906 | 7324 |
| 700 | 7081 | 7256 | 6982 | 6799 | 6995 |
| 750 | 7008 | 6214 | 6976 | 6347 | 7599 |
| 800 | 1566 | 1389 | 1481 | 1671 | 2044 |

METHOD FOR DETECTING SOLID-LIQUID DISTRIBUTION IN SOLID-LIQUID SEPARATION COLUMN OF SOLID-LIQUID SEPARATION DEVICE AND DETECTION DEVICE

TECHNICAL FIELD

The present invention relates to a technique for concentrating a fluid by separating the fluid into a solid and a liquid using a freeze concentration technique. More specifically, the present invention relates to a method and a device for detecting a solid-liquid distribution in a solid-liquid separation column in which a fluid is separated into a solid and a liquid.

BACKGROUND ART

A freeze concentration method has been known as one of the methods of concentrating a fluid. With the freeze concentration method, a process subject fluid to be concentrated is stored and cooled in a solid-liquid separation column. Ice crystals are produced in the process subject fluid due to cooling, and the process subject fluid is concentrated due to the production of the ice crystals. These ice crystals are separated from the concentrated process subject fluid in the solid-liquid separation column.

The applicant of the present invention also suggests such a freeze concentration method and a method of manufacturing a concentrated product with utilization of the freeze concentration device (Patent Documents 1 and 2.)

In the solid-liquid separation column of the freeze concentration device, ice crystals move to an upper part of the column, and the process subject fluid concentrated due to the production of the ice crystals moves to a lower part of the column. This is considered to be caused by a flow of the process subject fluid and differences in specific gravity in the solid-liquid separation column.

Generally, the part that is filled with accumulated ice crystals is referred to as an ice bed layer. In order to run the freeze concentration device stably, it is required to appropriately control the height of the lower end of the ice bed layer in the solid-liquid separation column.

The ice bed layer refers to the area which is filled with compressed sherbet-like ice crystals that have been lifted to the upper part inside of the solid-liquid separation column due to differences in specific gravity and the flow of the process subject fluid in the solid-liquid separation column.

The layer of the concentrated process subject fluid that is not filled with ice crystals lies below the ice bed layer, and the lower end of the ice bed is in contact with the upper end of the layer of the concentrated process subject fluid.

The control range of the height of the lower end of the ice bed is set as roughly ±10 cm of the reference position.

In the case where raw milk is concentrated by the freeze concentration method, for example, when the height of the lower end of the ice bed in the solid-liquid separation column is out of the range that is about ±10 cm of the reference position, the ice bed may collapse, and a milk solid may leak into a separation water. Thus, the milk cannot be concentrated. A hole penetrating the ice bed in the up-and-down direction is formed in a portion of the ice bed, and the concentrated milk under the ice bed flows out to the top of the ice bed through this hole. This prevents the milk from being concentrated.

It is necessary to appropriately control the height of the lower end of the ice bed in the solid-liquid separation column in order to run the freeze concentration device stably.

The ice crystals and the process subject fluid concentrated by the production of the ice crystals are mixed and sherbet-like near the lower end of the ice bed in the solid-liquid separation column.

Therefore, it is extremely difficult to observe the lower end of the ice bed with human eyes, and there is a limit to the measurement accuracy when the lower end of the ice bed is monitored with human eyes. Such a necessity of a human operation prevents the freeze concentration device from being automatically operated. It is extremely difficult to visually tell the lower end of the ice bed, and the measurement accuracy is poor due to a measurement error and large variations in value measured by humans. The height of the lower end of the ice bed is, however, controlled manually by an operator, and the operation of the freeze concentration device has not been automated.

There has not been an example of the automatic measurement of the height of the lower end of the ice bed even in the world.

PATENT DOCUMENTS

Patent Document 1: WO2015/030161
Patent Document 2: WO2015/030162

SUMMARY OF THE INVENTION

Problems to be Solved by the Invention

An object of the present invention is to suggest a method and a device for detecting a solid-liquid distribution in a solid-liquid separation column that separates ice crystals from a process subject fluid concentrated by production of the ice crystals in a freeze concentration device used when a freeze concentration method is performed.

Means for Solving the Problems

[1] A device for detecting a solid-liquid distribution in a solid-liquid separation column of a solid-liquid separation device, comprising:
a light irradiation means for irradiating an inside of the solid-liquid separation column of a freeze concentration device with visible light;
a photographing means for picking up an image of the inside of the solid-liquid separation column irradiated with the visible light by the light irradiation means;
a movement means for moving the photographing means in an up-and-down direction of the solid-liquid separation column;
an image analysis means for analyzing a data piece of an image picked up by the photographing means; and
a determination means for determining a solid-liquid distribution state in the solid-liquid separation column based on a result of an analysis made by the image analysis means.

[2] The device described in [1] for detecting the solid-liquid distribution, wherein
the photographing means is a CCD camera,
an analysis of an image data piece made by the image analysis means is a process of dividing the image data piece into image data pieces of any small regions and averaging numerical values indicating lightness and darkness of pixel data pieces of the divided small regions, and the determination means determines that solid-liquid distribution states are different from each other when a difference between average values of the numerical values indicating the lightness and darkness of the pixel data pieces of the small regions exceeds a predetermined threshold, the average values being obtained in different areas in an up-and-down direction of the solid-liquid separation column.

[3] A method of detecting a solid-liquid distribution in a solid-liquid separation column of a solid-liquid separation device, including:

irradiating an inside of the solid-liquid separation column of a freeze concentration device with visible light;

picking up an image of the inside of the solid-liquid separation column irradiated with the visible light by the light irradiation means using a photographing means that moves in an up-and-down direction of the solid-liquid separation column;

analyzing a data piece of an image picked up by the photographing means using an image analysis means; and determining a solid-liquid distribution state in the solid-liquid separation column based on a result of an analysis made by the image analysis means.

[4] The method described in [3] of detecting the solid-liquid distribution, wherein the photographing means is a CCD camera, an analysis of an image data piece made by the image analysis means is a process of dividing the image data piece into image data pieces of any small regions and averaging numerical values indicating lightness and darkness of pixel data pieces of the divided small regions, and the determining determines that solid-liquid distribution states are different from each other when a difference between average values of the numerical values indicating the lightness and darkness of the pixel data pieces of the small regions exceeds a predetermined threshold, the average values being obtained in different areas in an up-and-down direction of the solid-liquid separation column.

Advantageous Effects of Invention

The present invention enables provision of the method and device for detecting the solid-liquid distribution in the solid-liquid separation column that separates ice crystals from the process subject fluid concentrated by production of the ice crystals in the freeze concentration device used when the freeze concentration method is performed.

The distribution state of the ice crystals in the solid-liquid separation column of the freeze concentration device can be appropriately identified, and the height of the lower end of the ice bed can be appropriately and quickly detected.

It is possible to appropriately and quickly detect the distribution state of the ice crystals and the height of the lower end of the ice bed in the solid-liquid separation column from outside of the solid-liquid separation column without directly coming into contact with the ice crystals or the process subject fluid in the solid-liquid separation column of the freeze concentration device that is used when the freeze concentration method is performed.

EMBODIMENTS FOR CARRYING OUT THE INVENTION

Figure 1:
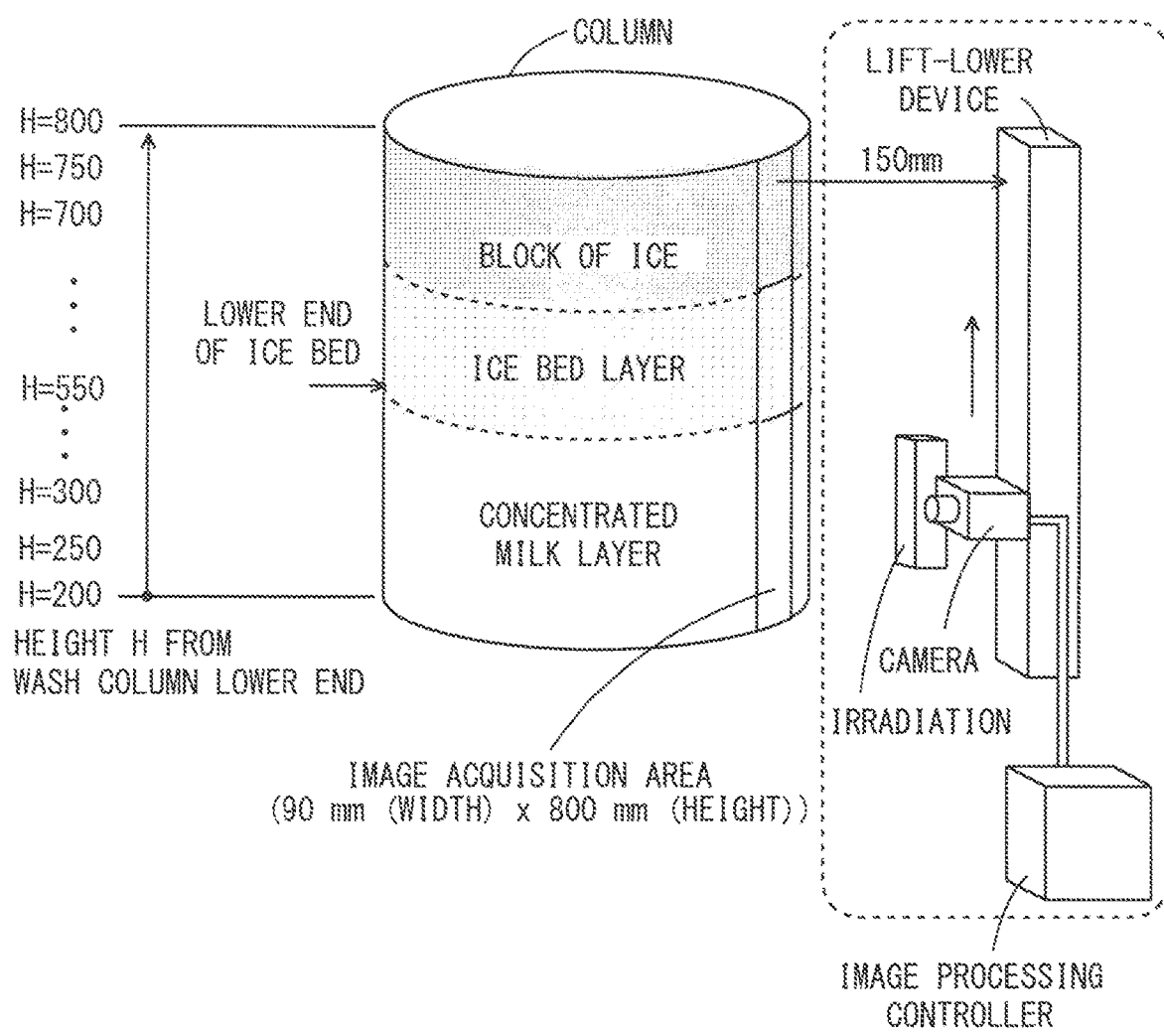
FIG. 1 is a diagram for explaining a schematic configuration of a device for detecting a solid-liquid distribution according to one embodiment.

The inventor of the present invention considered to detect and determine the distribution of ice crystals present in a solid-liquid separation column separating the ice crystals from a process subject fluid concentrated due to production of the ice crystals in a freeze concentration device by applying an image analysis technique. Then, the inventor of the present invention discovered that the distribution of the ice crystals can be automatically measured using the image analysis technique and completed the present invention.

The inventor of the present invention paid attention to the fact that shadows are generated when particles of the ice crystals and the like produced from the process subject fluid stored in the solid-liquid separation column of the freeze concentration device are irradiated with light.

Then, the inventor of the present invention considered to measure and detect a distribution state of the ice crystals by obtaining the counted quantity of shadows (the total number of shadows) in an image by the image analysis.

Then, the inventor of the present invention discovered that, when an image of the inside of the solid-liquid separation column irradiated with light is picked up by a photographing means that moves in an up-and-down direction of the solid-liquid separation column, and a predetermined image analysis process is performed on an image data piece of the image picked up by the photographing means, the solid-liquid distribution state in the solid-liquid separation column can be determined based on the result of analysis.

This enables appropriate and quick detection of the distribution state of the ice crystals and a height of the lower end of an ice bed in the solid-liquid separation column from outside of the solid-liquid separation column without direct contact with the ice crystals or the process subject fluid in the solid-liquid separation column of the freeze concentration device that is used when the freeze concentration method is performed.

The solid-liquid separation column of the freeze concentration device to which the present invention is applied includes a part that is made of the material that transmits visible light, has the color (transparent, for example) that transmits the visible light and extends in the up-and-down direction of the solid-liquid separation column.

A subject of the present invention is not limited to the automatic measurement of the height of the lower end of the ice bed in the solid-liquid separation column of the freeze concentration device. The present invention is also effective for the measurement of a particle size distribution in a tank through which visible light is transmitted from outside to inside.

The device that detects the solid-liquid distribution in the solid-liquid separation column of the one embodiment of the present invention includes a light irradiation means, a photographing means, a movement means, an image analysis means and a determination means.

An LED illuminator can be employed as the light irradiation means. Thus, the inside of the solid-liquid separation column of the freeze concentration device can be irradiated with visible light.

A CCD camera can be employed as the photographing means. Thus, images of the inside of the solid-liquid separation column irradiated with visible light by the light irradiation means can be picked up.

The movement means can move the photographing means in the up-and-down direction of the solid-liquid separation column.

The image analysis means can analyze an image data piece of an image picked up by the photographing means.

The determination means can determine a solid-liquid distribution state in the solid-liquid separation column based on a result of an analysis made by the image analysis means.

The analysis of an image data piece made by the image analysis means is a process of dividing the image data piece into image data pieces of any small regions and averaging numerical values indicating lightness and darkness of pixel data pieces of the divided small regions, for example.

The determination is to be made by the determination means, for example that the solid-liquid distribution states are different from each other when the difference between the average values of the numerical values indicating lightness and darkness of the pixel data pieces of the small regions exceeds a predetermined threshold, the average values being obtained in different areas in an up-and-down direction of the solid-liquid separation column.

For example, the total amount of the average values of the numerical values, indicating the lightness and darkness of the pixel data pieces of the above-mentioned small regions of which the CCD camera picks up images during movement in the up-and-down direction by a predetermined distance is compared to the total amount of the average values of the numerical values, indicating the lightness and darkness of the pixel data pieces of the above-mentioned small regions of which the CCD camera picks up images during movement in the up-and-down direction by a predetermined distance and the compared movement areas are different in the up-and-down direction. Then, when the difference between the total amounts of the average values exceeds the predetermined threshold, it is determined that the solid-liquid distribution states of the regions are different from each other.

The analysis of the image data piece is made by the above-mentioned image analysis means using one of the analysis methods employed when the CCD (Charge Coupled Device) camera is used to detect foreign matter such as a pin hole, a tear or a defect on a surface of an inspection subject, for example. Further, the analysis of the image data piece is made by the above-mentioned image analysis means using the image analysis method for extracting a portion, the image of which has lightness and darkness (that is, conversion of light intensity into numbers) different from the other regions, that is generated due to a tear or a stain.

When an inspection is made to detect a tear or a stain using the CCD camera, simple binarization is generally performed on each acquired pixel, and lightness and darkness of adjacent pixels are compared. However, when the light level of the image changes due to irregular reflection of the light emitted by a light irradiator, the state of binarization changes. Therefore, the inspection becomes unstable.

In contrast, with the method of analyzing an image data piece performed by the above-mentioned image analysis means for detection of foreign matter, a defect or the like on the surface of an inspection subject, binarization is not performed on each pixel, but lightness and darkness of pixels in any small region are averaged, and then binarization is performed. As such, even when the light levels of all regions are different, an inspection can be stably made. The analysis method is effective especially for the inspection for detecting a tear or a stain on a reflection subject.

With the method of detecting the solid-liquid distribution in the solid-liquid separation column of the present embodiment, the inside of the solid-liquid separation column is irradiated with visible light emitted by the LED illuminator or the like located outside of the solid-liquid separation column of the freeze concentration device through the solid-liquid separation column.

The CCD camera simultaneously picks up images of the inside of the solid-liquid separation column through the solid-liquid separation column while being outside of the solid-liquid separation column and moved in the up-and-down direction of the solid-liquid separation column.

When ice crystals are produced in the process subject fluid stored in the solid-liquid separation column, particles of ice crystals and the like are irradiated with the visible light. When the particles of the ice crystals and the like are irradiated with the visible light, shadows are generated.

The shadows generated for these particles are interpreted as tears, and the total tear amount is obtained by the image analysis.

The above-mentioned image analysis means performs the image data analysis process of dividing an image data piece of an image into image data pieces of any small regions in the image and averaging the numerical values indicating the lightness and darkness of the pixel data pieces of the divided small regions, whereby the average value of the number of shadows (that is, the number of tears) corresponding to the number of particles of the ice crystals in the small regions can be obtained.

In the solid-liquid separation column, the more particles there are in a region, the larger the number of shadows in the region is, and the larger the total number of tears in the region is.

As such, when the counted quantity of shadows (the total number of shadows) in the image picked up by the CCD camera is taken as an index, it is possible to find out about the distribution state of particles of ice crystals and the like inside of the solid-liquid separation column without directly coming into contact with the contents in the solid-liquid separation column.

In the present embodiment, the total number of shadows measured by the above-mentioned image analysis means using the method of analyzing an image data piece, that is, the total sum of the counted quantity of tears in a region may be referred to as the total tear amount.

Inventive Example 1

FIG. 1 is a diagram for explaining the schematic configuration of the present invention.

In the present embodiment, the solid-liquid separation column that separates ice crystals from a process subject fluid that is concentrated due to production of the ice crystals includes a part that is made of the material that transmits visible light, has the color (transparent, for example) that transmits the visible light and extends in the up-and-down direction. In the inventive example shown in the diagram, the part is an "image acquisition area" that is made of a transparent part having dimensions of 90 mm (width)×800 mm (height.)

The light irradiation means (white LED illuminator, for example) and the photographing means (CCD camera) are provided outside of and in close proximity to the solid-liquid separation column while being near the "image acquisition area" of the solid-liquid separation column.

The light irradiation means (white LED illuminator, for example) irradiates the inside of the separation column with visible light through the "image acquisition area."

The photographing means (CCD camera) picks up images of the inside of the solid-liquid separation column irradiated with light through the "image acquisition area."

The light irradiation means (white LED illuminator, for example) and the photographing means (CCD camera) are movable in the up-and-down direction in an area extending in the up-and-down direction by 800 mm corresponding to the "image acquisition area" by a lift-lower device, which is the movement means.

The image data piece of the image, of the inside of the solid-liquid separation column irradiated with light, picked up by the photographing means (CCD camera) is transmitted to an image processing controller. Then, an analysis of the image and determination are made in the image processing controller.

The lift-lower device is operated every predetermined time length, and the images of the inside of the liquid separation column are acquired continuously as the lift-lower device moves the camera in the up-and-down direction.

In the image processing controller, a process of dividing the data piece of an image into data pieces of any small regions in the image and averaging the numerical values indicating the lightness and darkness of the pixel data pieces of the divided small regions in the image is performed.

The image data analysis process, of dividing a data piece of an image into data pieces of any small regions in the image and averaging the numerical values indicating the lightness and darkness of the pixel data pieces of the divided small regions in the image, enables the average value of the number of shadows (that is, the number of tears) corresponding to the number of particles of ice crystals in the divided small regions to be obtained.

Then, in the image processing controller, performed is a process of determining that the solid-liquid distribution states are different from each other when the difference between the average values of the numerical values indicating the lightness and darkness of the pixel data pieces of the small regions exceeds a predetermined threshold, the average values being obtained in different areas in an up-and-down direction of the solid-liquid separation column.

For example, the total amount of the average values of the numerical values, indicating the lightness and darkness of the pixel data pieces of the above-mentioned small regions of which the CCD camera picks up images during the movement in the up-and-down direction by a predetermined distance is compared to the total amount of the average values of the numerical values, indicating the lightness and darkness of the pixel data pieces of the above-mentioned small regions of which the CCD camera picks up images during movement in the up-and-down direction by a predetermined distance and the compared movement areas are different in the up-and-down direction. This comparison allows the determination to be made that the solid-liquid distribution states of the regions are different from each other when the difference between the total amounts of the average values exceeds the predetermined threshold.

That is to say, in the case where each acquired image is analyzed, and the total tear amount is obtained, when the total tear amount is equal to or larger than the preset total tear amount of the lower end of the ice bed, the image, that is, the height of the region corresponding to the image is identified as the height of the lower end of the ice bed.

Inventive Example 2

A method of detecting the solid-liquid distribution in the solid-liquid separation column that separates ice crystals from a process subject fluid concentrated due to production of the ice crystals was performed in a freeze concentration device using the device for detecting the solid-liquid distribution described in the inventive example 1.

Raw milk was put in the solid-liquid separation column described in the inventive example 1, and the raw milk was cooled such that ice crystals were produced. The milk was separated into the ice crystals and the concentrated milk that was concentrated due to the production of the ice crystals.

When the inside of the solid-liquid separation column was observed through the "image acquisition area" of the solid-liquid separation column, it was confirmed that the raw milk was separated into the upper ice bed layer and the lower concentrated milk layer as shown in FIG. 1.

As described in the inventive example 1, the lift-lower device was operated, and the images of the inside of the solid-liquid separation column were picked up every time the CCD camera was moved by 50 mm (a reference height) in the up-and-down direction. The images of the inside of the solid-liquid separation column were picked up with each inspection area having a width of 60 mm and a length of 60 mm, and having each reference height as a middle position in the up-and-down direction.

In this inventive example, a process of dividing an image data piece of each picked image into image data pieces of small regions of segments with each segment including 4-by-4 pixels and averaging the numerical values indicating the lightness and darkness of the pixel data pieces of the divided small regions was performed. Then, the total amount of the average values of the numerical values indicating the lightness and darkness of the pixel data pieces of the small regions in the inspection area was obtained.

In the measurement 1, the total tear amount was 2266 when the reference height was 200 mm in the column, and the total tear amount was 2052 when the reference height was 500 mm in the column, and the total tear amount was 6897 when the reference height was 550 mm in the column. The lower end of the ice bed was actually at the height of 550 mm in the column. As such, the total tear amount largely changed around the image including the lower end of the ice bed was picked up.

Figure 2:
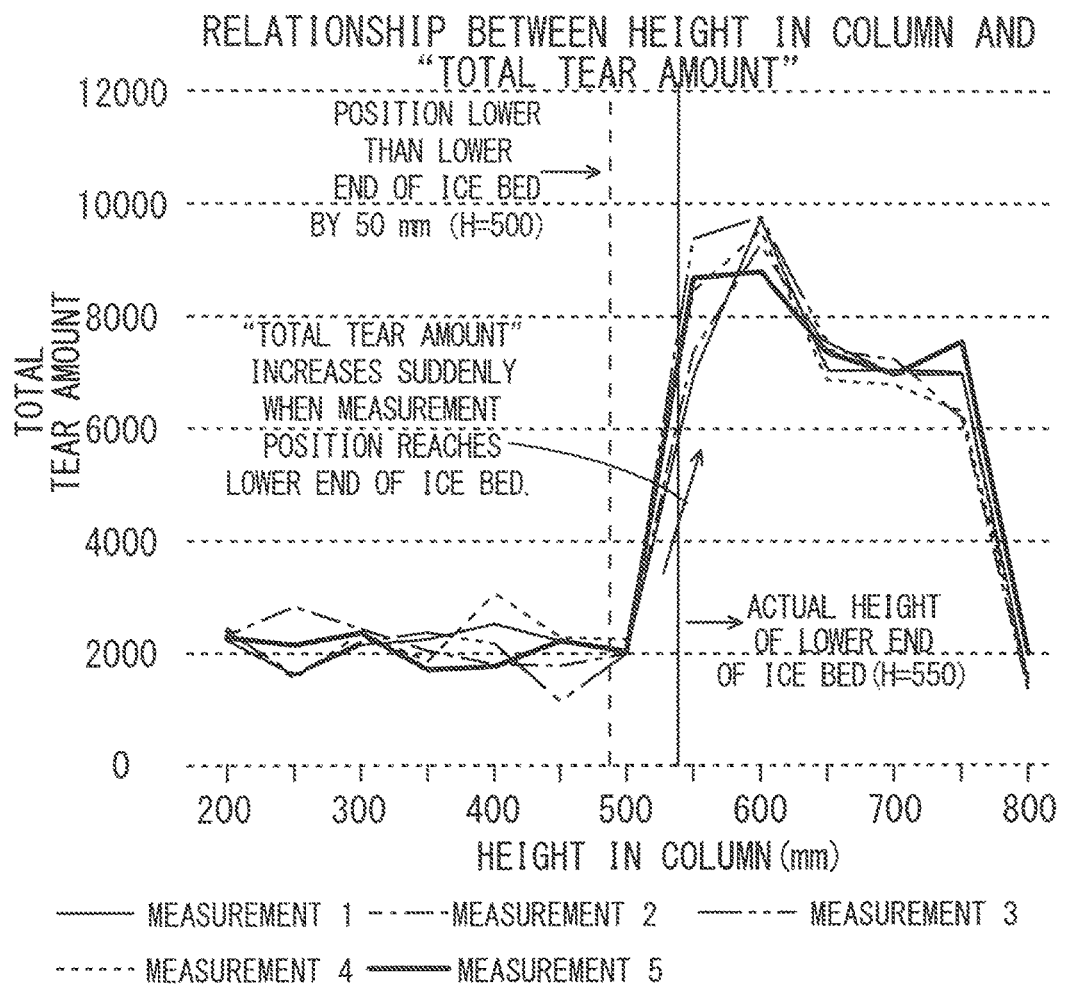
FIG. 2 is a diagram showing results of measurement carried out with a method of detecting a solid-liquid distribution according to the one embodiment.

The result shown in FIG. 2 was acquired when the above measurement was repeated five times. The lower part of FIG. 2 indicates the result when the measurement was carried out five times, and the upper part of FIG. 2 shows this result graphically.

In either case, many shadows were generated by ice crystals in the ice bed layer filled with the ice crystals, and few shadows were found in the concentrated milk layer. When the change of the total tear amount was shown graphically, it was found that the total tear amount largely changed around the lower end of the ice bed was included in the image.

The same tendency was observed in the measurement that was repeated five times, and reproducibility was confirmed.

While embodiments and inventive examples of the present invention have been described above with reference to the accompanying drawings, the present invention is not limited to these. Modifications can be made variably within the technical scope interpreted by the scope of claims.

The invention claimed is:

1. A device for detecting a solid-liquid distribution in a solid-liquid separation column of a solid-liquid separation device, comprising:
   a light source for irradiating an inside of the solid-liquid separation column of a freeze concentration device with visible light;
   a camera for picking up an image of the inside of the solid-liquid separation column irradiated with the visible light by the light source, the camera movable in an up-and-down direction of the solid-liquid separation column; and
   a controller configured to:
   analyze a data piece of an image picked up by the camera; and
   determine a solid-liquid distribution state in the solid-liquid separation column based on a result of the analysis.

2. The device for detecting the solid-liquid distribution according to claim 1, wherein
   the camera is a CCD camera,
   an analysis of an image data piece made by the controller is a process of dividing the image data piece into image data pieces of any small regions and averaging numerical values indicating lightness and darkness of pixel data pieces of the divided small regions, and
   the controller determines that solid-liquid distribution states are different from each other when a difference between average values of the numerical values indicating the lightness and darkness of the pixel data pieces of the small regions exceeds a predetermined threshold, the average values being obtained in different areas in an up-and-down direction of the solid-liquid separation column.

3. A method of detecting a solid-liquid distribution in a solid-liquid separation column of a solid-liquid separation device, including:
   irradiating an inside of the solid-liquid separation column of a freeze concentration device with visible light;
   picking up an image of the inside of the solid-liquid separation column irradiated with the visible light by the light irradiation means using a photographing means that moves in an up-and-down direction of the solid-liquid separation column;
   analyzing a data piece of an image picked up by the photographing means using an image analysis means; and
   determining a solid-liquid distribution state in the solid-liquid separation column based on a result of an analysis made by the image analysis means.

4. The method of detecting the solid-liquid distribution according to claim 3, wherein
   the photographing means is a CCD camera,
   an analysis of an image data piece made by the image analysis means is a process of dividing the image data piece into image data pieces of any small regions and averaging numerical values indicating lightness and darkness of pixel data pieces of the divided small regions, and
   the determining determines that solid-liquid distribution states are different from each other when a difference between average values of the numerical values indicating the lightness and darkness of the pixel data pieces of the small regions exceeds a predetermined threshold, the average values being obtained in different areas in an up-and-down direction of the solid-liquid separation column.

* * * * *